July 14, 1953  H. I. BECKER  2,645,534
PRESSURIZED BEARING
Filed Feb. 10, 1950

Inventor:
Howard I. Becker,
by *Claude H. Noto*
His Attorney.

Patented July 14, 1953

2,645,534

UNITED STATES PATENT OFFICE 2,645,534

PRESSURIZED BEARING

Howard I. Becker, Rexford, N. Y., assignor to General Electric Company, a corporation of New York Application February 10, 1950, Serial No. 143,547

1 Claim. (Cl. 308—9)

This invention relates to pressurized bearings and, in particular, to a new and improved type of pressurized air bearing.

Pressurized bearings are generally referred to as those having lubricating material forced into the bearing under pressure, and such pressurized lubricant, dependent upon the bearing area and lubricant pressure, helps carry a considerable portion of the load and a pressurized supply aids in assuring a required amount of lubricant to the bearing surface.

With reference to the usual ball and socket joints, for example, wherein a metal ball is rotated in a metal socket in which a lubricant is supplied under pressure at the lowermost point in the socket, if air is used as the lubricant, difficulty arises under overload conditions, since the ball, in being overloaded, may easily shut off the supply of air lubricant, and the metal ball will be scored by contact with the metal socket.

There are times, however, when it is desirable to provide an air bearing, since air lubricant substantially reduces friction losses, if properly designed, and again, in some circumstances, oil cannot be tolerated as a lubricant; for example, in sealed instruments where chemicals repulsive to oil are in use.

It is an object of this invention to provide a new and improved type of pressurized bearing.

It is a further object of this invention to provide a new and improved type of pressurized bearing in which air is used as the lubricant.

It is a still further object to provide a pressurized bearing in which a metal ball is suspended by air lubrication in a porous graphitized carbon cup.

In carrying out my invention in one form, I utilize a porous graphitized carbon liner as a bearing surface and force air through substantially the entire liner surface to act as a lubricant.

Further objects and advantages of this invention will become apparent and the invention will be more clearly understood from the following description referring to the accompanying drawing, and the features of novelty which characterize this invention will be pointed out with particularity in the claim annexed to and forming a part of this specification.

Figure 1:
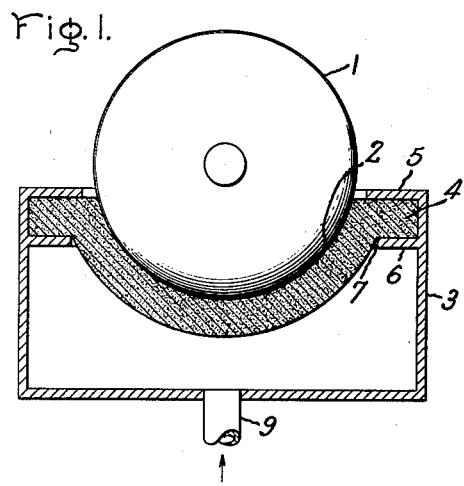
Figure 2:
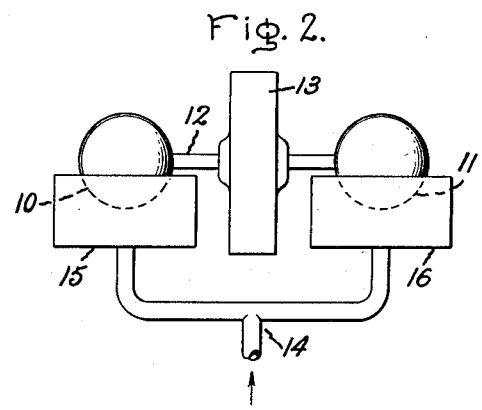
Figure 3:
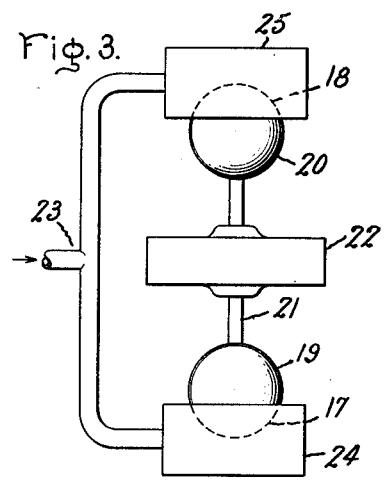
Figure 4:
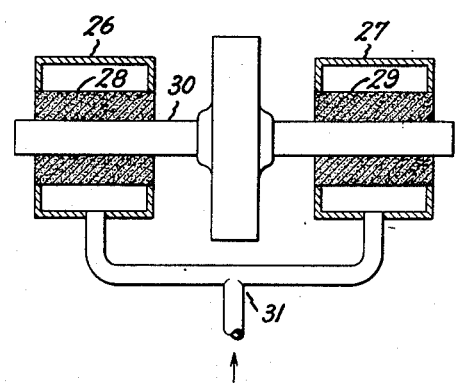
Figure 5:
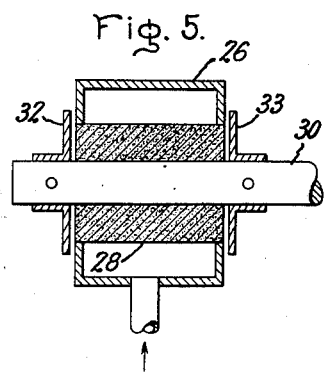

In the drawing, Fig. 1 is a diagrammatic view of the new and improved pressurized bearing of the ball and socket type; Fig. 2 is a diagrammatic view of a modification of this new and improved air bearing; while Figs. 3, 4 and 5 are diagrammatic views of still further modifications of this new and improved air bearing.

Referring to the drawing, a rotatable metal ball 1 is shown supported in a socket or concave bearing surface 2 provided within a hollow housing 3. Actually, a cup-shaped bearing liner 4 of porous graphitized carbon is mounted in the housing 3 to close one apertured wall thereof, as by positioning the liner centrally between a top portion 5 of hollow housing 3 and a ring 6 which has an internal periphery 7 shaped to accommodate cup 4. Cup 4 is substantially of the same radius as that of ball 1.

An air tube (not shown) conducts compressed air from any suitable source (not shown) to an inlet pipe 9, which leads the compressed air into a chamber in the housing 3. The compressed air, after entering chamber 3, escapes through porous cup 4 to the atmosphere. As the air passes between cup 4 and ball 1, it provides a lubricant for the support of the ball.

It has been found from numerous tests that the compressed air in passing uniformly through the porous graphitized carbon cup 4 supports ball 1 for rotation. There is less danger of the ball, when overloaded, shutting off all the air supply entering between ball 1 and porous cup 4 than there would be if only a single opening were available. Furthermore, there is little or no danger of accumulated dirt clogging the air passages into the bearing surface. In addition, if the metal ball is overloaded, it rubs on the graphite, which itself is a well-known lubricant.

In the modification of this invention shown in Fig. 2, a pair of the improved pressurized bearings 10 and 11, each comprising a metal ball and a socket of graphitized carbon as above described, are used to support a horizontal shaft 12 provided with a wheel 13. In this modification, however, an air tube is connected to a T-joint 14 that conducts compressed air equally into housings 15 and 16 that respectively support bearings 10 and 11.

It has been found from numerous tests that the structure shown in Fig. 2 will satisfactorily support rotating wheel 13 with a much lower drag friction than that which would exist if oil were used for lubricant. It has been further found that the structure shown in Fig. 2 will also satisfactorily handle overload conditions which usually cannot be tolerated in an air bearing, due to the metal graphited carbon combination.

In the embodiment of this invention shown in Fig. 3, a differential pressurized air bearing is shown. Specifically, a pair of ball and socket bearings 17 and 18 are shown supported vertically one above the other with upper bearing 18 being inverted in relation to lower bearing 17. Balls 19 and 20 are connected by a vertical shaft 21 provided centrally with a wheel 22 rotatable in a horizontal plane. An air tube is connected to a T-joint 23 that conducts compressed air to housings 24 and 25 that respectively support bearings 17 and 18. It is to be understood that the structure of bearings 17 and 18 is identical to that described in Fig. 1 of the drawing.

The interesting feature of this embodiment of the improved pressurized bearing is that it is a differential pressurized bearing. Specifically, when wheel 22 is loaded to increase the downward thrust of ball 19 in bearing 17, the natural tendency is for ball 19 to settle lower into bearing 17. This increases the pressure on the air passing through the porous graphitized cup that forms bearing 17. Ordinarily, the lift on bearing 17 is a product of the projected area times the pressure; under the above circumstances, as the pressure on the air passing through bearing 17 is increased, the lift on ball 19 is increased.

The overloading of wheel 22, forcing ball 19 deeper into bearing 17, also causes ball 20 to recede from bearing 18. The air passageway between ball 20 and bearing 18 is, consequently, increased and naturally the pressure of the air passing through bearing 18 is decreased. The result of the overload, then, is that the downward thrust of bearing 18 is decreased and the upward thrust of bearing 17 is increased, which gives a greater tendency to support ball 19 in bearing 17 and gives an automatic differential action.

It is to be noted that if it were not for this automatic differential action, such a bearing as that shown in Fig. 3 could not support any load, since upper bearing 18, having the same area and pressure as lower bearing 17, would neutralize the lift of lower bearing 17 and the bearing would be incapable of holding up a load.

Numerous tests on the type bearing described in Fig. 3 have shown that a wheel such as that indicated at 22 can be rotated in a horizontal plane with a much lower friction drag than that which would result if oil were used as the lubricant.

In the embodiment shown in Fig. 4, an automatic differential bearing of the sleeve type is shown. Specifically, bearing housings 26 and 27 are hollow and centrally position porous graphitized carbon sleeves or bearing liners 28 and 29. A horizontal shaft 30 is supported by sleeve bearings 28 and 29. An air tube is connected to a T-joint 31 which conducts compressed air to each of the bearing housings. As shaft 30 rotates, the differential action explained in connection with Fig. 3 takes place and the shaft rotates freely at a much smaller frictional drag than that which would exist if an analogous pair of oil lubricated bearings were used.

In the embodiment shown in Fig. 5, a thrust bearing effect is added to the automatic differential air bearing. Specifically, a pair of collars 32 and 33 are secured to shaft 30 on either end of each of the bearing housings 26. Air escaping through porous graphitized sleeve bearings 28 passes along shaft 30 towards collars 32 and 33. The air then escapes to the atomsphere between collars 32 and 33 and their respective ends of housing 26. This escaping air acts as a cushion or thrust bearing to properly position shaft 30 in porous graphitized sleeve bearings 28.

Modifications of this invention will occur to those skilled in the art and it is desired to be understood, therefore, that this invention is not to be limited to the particular embodiment disclosed, but that the appended claim is meant to cover all the modifications which are within the spirit and scope of this invention.

What I claim as new and desire to secure by Letters Patent of the United States is:

An air bearing comprising a bearing housing formed to provide a chamber having an apertured wall, a bearing liner formed of porous oil free graphitized carbon and having an outer supporting lip surrounding the bearing engaging portion of the bearing liner, said liner positioned so as to cover said aperture to close said chamber and the entire outer surface of the bearing engaging portion of the liner being exposed to the atmosphere of said chamber, and means for supplying air under pressure to said chamber, whereby escape of air through said porous liner is substantially uniformly distributed over said bearing surface.

HOWARD I. BECKER.

References Cited in the file of this patent

UNITED STATES PATENTS

| Number | Name | Date |
|---|---|---|
| 1,385,423 | Bibbins | July 26, 1921 |
| 1,816,758 | Adams | July 28, 1931 |
| 1,930,277 | Lenz | Oct. 10, 1933 |
| 2,179,824 | Kip | Nov. 14, 1939 |
| 2,342,055 | Laboulais | Feb. 15, 1944 |
| 2,442,202 | Caley | May 25, 1948 |

FOREIGN PATENTS

| Number | Country | Date |
|---|---|---|
| 548,363 | Great Britain | Oct. 7, 1942 |
| 896,233 | France | Feb. 15, 1945 |